(12) United States Patent
Mansouri et al.

(10) Patent No.: US 12,139,259 B2
(45) Date of Patent: Nov. 12, 2024

(54) FLAT SANDWICH PANEL ARTICULATING BOTTOM PAN

(71) Applicant: Safran Seats USA LLC, Gainesville, TX (US)

(72) Inventors: Reza Mansouri, Costa Mesa, CA (US); Romain Tranier, Costa Mesa, CA (US); Charles Michael Parker, Irvine, CA (US); Gokul Ramarathnam, Irvine, CA (US)

(73) Assignee: SAFRAN SEATS USA LLC, Gainesville, TX (US)

( * ) Notice: Subject to any disclaimer, the term of this patent is extended or adjusted under 35 U.S.C. 154(b) by 333 days.

(21) Appl. No.: 17/435,676

(22) PCT Filed: Mar. 29, 2019

(86) PCT No.: PCT/US2019/024841
§ 371 (c)(1),
(2) Date: Sep. 1, 2021

(87) PCT Pub. No.: WO2020/204877
PCT Pub. Date: Oct. 8, 2020

(65) Prior Publication Data
US 2022/0135232 A1    May 5, 2022

(51) Int. Cl.
*B64D 11/06* (2006.01)
*B32B 3/12* (2006.01)
(Continued)

(52) U.S. Cl.
CPC ............ *B64D 11/0647* (2014.12); *B32B 3/12* (2013.01); *B32B 7/12* (2013.01); *B32B 15/043* (2013.01);
(Continued)

(58) Field of Classification Search
CPC .. B60N 2/7011; B60N 2/686; B64D 11/0647; B64D 11/0648; B32B 3/12; B32B 7/12;
(Continued)

(56) References Cited

U.S. PATENT DOCUMENTS 2,270,172 A  *  1/1942  Ruegger .................. B60N 2/10
                                                        297/216.19
4,025,114 A  *  5/1977  Cave ...................... A47C 7/185
                                                        297/DIG. 2
(Continued)

FOREIGN PATENT DOCUMENTS

CN        1820936 A      8/2006
CN      105936163 A      9/2016
(Continued)

OTHER PUBLICATIONS

China Patent Application No. 201980094941.7, Office Action, dated Jun. 1, 2023.
(Continued)

*Primary Examiner* — Milton Nelson, Jr.
(74) *Attorney, Agent, or Firm* — Kilpatrick Townsend & Stockton LLP (57) ABSTRACT

Described are passenger seat bottom assemblies that include a layered seat bottom assembly formed of a first face sheet, a lightweight core layer, and a second face sheet bonded together, preferably in a flat or substantially flat arrangement. The core layer can be a honeycomb structure, e.g. a metal or aluminum honeycomb, or a foam, that confers a high strength and stiffness to the seat bottom assembly with minimal forming and minimal weight.

19 Claims, 4 Drawing Sheets

(51) Int. Cl.
  *B32B 7/12* (2006.01)
  *B32B 15/04* (2006.01)
  *B32B 15/14* (2006.01)
  *B32B 15/20* (2006.01)
  *B60N 2/68* (2006.01)
  *B60N 2/70* (2006.01)
  *B60N 2/72* (2006.01)

(52) U.S. Cl.
  CPC ............ *B32B 15/046* (2013.01); *B32B 15/14* (2013.01); *B32B 15/20* (2013.01); *B60N 2/686* (2013.01); *B64D 11/0648* (2014.12); *B32B 2250/40* (2013.01); *B32B 2307/732* (2013.01); *B32B 2605/00* (2013.01); *B60N 2/7011* (2013.01); *B60N 2/72* (2013.01)

(58) Field of Classification Search
  CPC ..... B32B 15/043; B32B 15/046; B32B 15/14; B32B 15/20; B32B 2250/40
  USPC ........... 297/452.57, DIG. 6, 329, 317, 344.1, 297/344.11, 452.48, 452.55
  See application file for complete search history.

(56) References Cited

U.S. PATENT DOCUMENTS

| | | | |
|---|---|---|---|
| 4,296,967 A | 10/1981 | Vogel | |
| 4,606,959 A | 8/1986 | Hillinger | |
| 5,860,701 A * | 1/1999 | Jungjohann | A47C 1/03294 297/316 |
| 6,641,214 B2 * | 11/2003 | Veneruso | B64D 11/06395 297/343 |
| 6,896,324 B1 | 5/2005 | Kull et al. | |
| 8,632,043 B2 * | 1/2014 | Dahlbacka | B60N 2/075 248/221.11 |
| 10,953,645 B2 * | 3/2021 | Picaut | B32B 37/146 |
| 2005/0265038 A1 | 12/2005 | Muller | |
| 2009/0142539 A1 | 6/2009 | Leng | |
| 2011/0148167 A1 | 6/2011 | Westerink et al. | |
| 2017/0036767 A1 | 2/2017 | Koncz | |

FOREIGN PATENT DOCUMENTS

| | | | | |
|---|---|---|---|---|
| EP | 2230178 A1 * | 9/2010 | ............. | B60N 2/682 |
| WO | WO-2015097155 A1 * | 7/2015 | ............. | B32B 15/08 |

OTHER PUBLICATIONS

International Patent Application No. PCT/US2019/024841, International Search Report and Written Opinion, dated Nov. 21, 2019.
Europe Appl. No. 19745329.3, Office Action, Nov. 22, 2023, 5 pages.
China Appl. No. 201980094941.7, Office Action, Mar. 7, 2024.
Chinese Application No. 201980094941.7, Office Action mailed on Jun. 18, 2024, 9 pages.

* cited by examiner

FLAT SANDWICH PANEL ARTICULATING BOTTOM PAN

FIELD OF THE INVENTION

The field of the invention relates to passenger seats.

BACKGROUND

In commercial aircraft, seats are designed to meet the needs of passenger safety and comfort, while accounting for strict limitations on weight and space. In existing aircraft designs, passenger seats are designed with rigid supportive structures to meet safety criteria, typically including formed composite seat pans that provide a supportive seating surface for passengers. Modern seat assemblies, however, are becoming more complex with time and require increased strength to incorporate improved safety features, although the driving concerns of passenger support, cost, and weight remain the same. To that end, improved structural performance solutions in seat assemblies, including seat pans, are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat bottom assembly for a passenger seat is disclosed that includes a seat pan, including a first face sheet, a core material bonded with the first face sheet, and a second face sheet bonded with the core material opposite the first face sheet. The seat bottom assembly may be planar or substantially planar, and can further include sliding connectors and/or lock mechanisms connected with the seat bottom assembly to facilitate articulation of the seat pan.

According to certain embodiments of the present invention, a passenger seat is disclosed that includes a seat frame configured to attach to a passenger compartment floor having a layered seat bottom assembly connected with the seat frame. The layered seat bottom assembly comprising can include any suitable combination of features described herein. The passenger seat can also include a seat back assembly pivotally connected with the seat frame.

Also disclosed is are methods of installing a seat bottom assembly in a passenger seat. Such methods include slidingly connecting a layered seat bottom assembly with a seat frame of a passenger seat assembly by one or more sliding connectors, where the seat bottom assembly and passenger seat may include any suitable combination of the features described herein.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide improved seat bottom assemblies for passenger seats. While the improves eat bottom assemblies are discussed for use with aircraft seats, they are by no means so limited. Rather, embodiments of the seat bottom assemblies may be used in passenger seats or other seats of any type or otherwise as desired.

Figure 1:
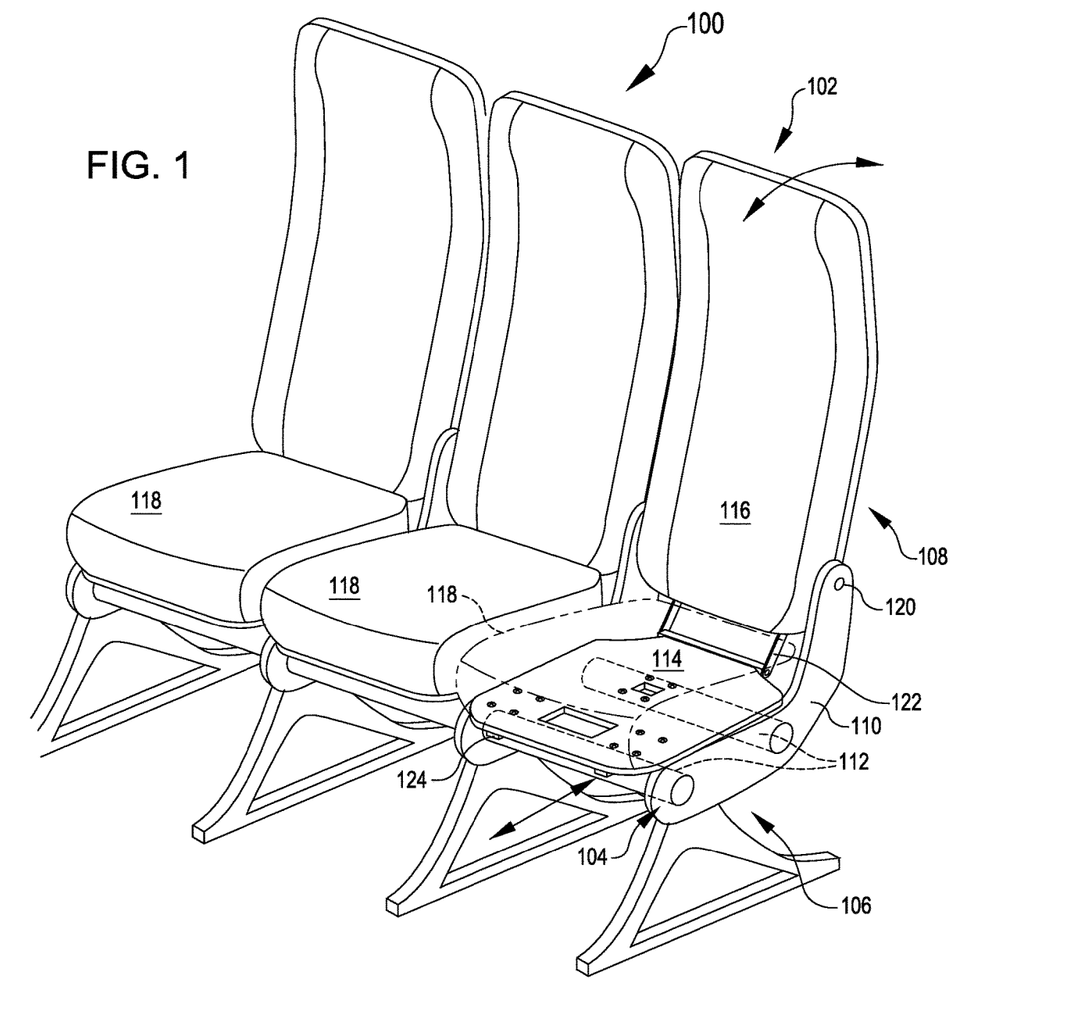
FIG. 1 is a perspective view of a seating arrangement including passenger seats having layered seat bottom assemblies, according to certain embodiments of the present disclosure.

According to certain embodiments of the present invention, as shown in FIG. 1, a passenger seating arrangement 100 can include one or multiple individual seat assemblies 102. each passenger seat assembly 102 includes a seat frame 104 that can be fixed to a floor of a passenger compartment, and that supports a seat bottom assembly 106 and seat back assembly 108. The seat back assembly is connected with the seat frame 104 by a set of frame arms 110 that provide a pivot element 120 above and behind the seat bottom assembly 106 to allow the seat back assembly 108 to recline. The seat bottom assembly 106 can be connected with the seat frame 104 by way of frame support tubes 112. However, alternative forms of supportive structures for a passenger seat may be employed in conjunction with the seat bottom assemblies disclosed herein.

The seat bottom assembly 106 includes a layered assembly forming a seat pan 114, which is positioned to receive a seat cushion 118 and positioned to work in conjunction with the seat back 116 to support a passenger. The seat bottom assembly 106 can be connected, e.g. at a rearward end of the seat pan 114 to the seat back 116 by way of an articulating linkage 122 that permits the seat bottom assembly 106 and seat back assembly 108 to move in concert with each other to recline the seat in response to force exerted by a passenger. To the same end, the seat bottom assembly 106 may be connected with the seat frame 104 by a set of sliding linkages 124 that permit the seat pan 114 to articulate with respect to the frame.

Figure 2:
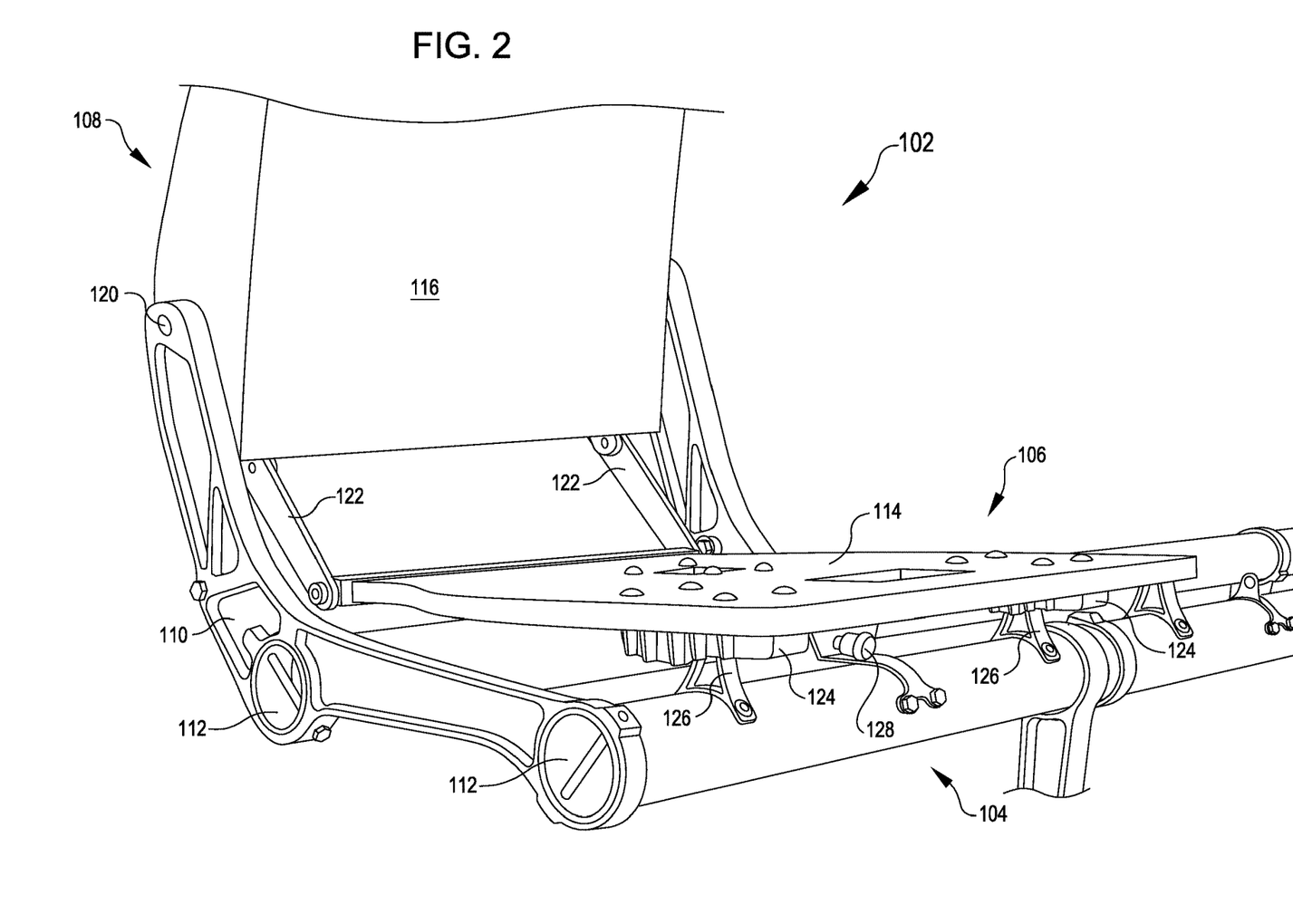
FIG. 2 is a perspective view showing a layered seat bottom assembly in a passenger seat as shown in FIG. 1.

FIG. 2 is a perspective view showing the seat bottom assembly 106 in a passenger seat assembly 102 as shown in FIG. 1, also showing an individual seat assembly 102 that includes the seat frame 104, seat bottom assembly 106, seat back assembly 108, frame arms 110, and frame support tubes 112. Features of the seat bottom assembly 106 are shown in additional detail, particularly the connection of the seat pan 114 with the frame support tubes 112 by way of a set of sliding linkages 124. The sliding linkages 124 are mechanically connected and interact with sliding supports 126 to allow the seat bottom to articulate with respect to the seat frame 104. A recline lock assembly 128 also connects the seat pan 114 with the frame, by way of the frame support tubes 112. The recline lock assembly 128 can be actuated by a passenger in the passenger seat assembly 102 to either allow or prevent reclining of the seat. In the event of an impact event, the recline lock assembly 128 can take a significant amount of sudden force. However, the unique assembly of the seat pan 114 provides sufficient structural support to safely transfer force between the seat pan 114, recline lock assembly 128, and seat frame 104 so as to maintain the structural integrity of the passenger seat 102 as a whole, and to transmit impulse correctly to the built-in safety mechanisms of the seat frame 104 and recline lock assembly 128. Features of the seat pan 114 are shown in more detail below with reference to FIGS. 3-5.

Figure 3:
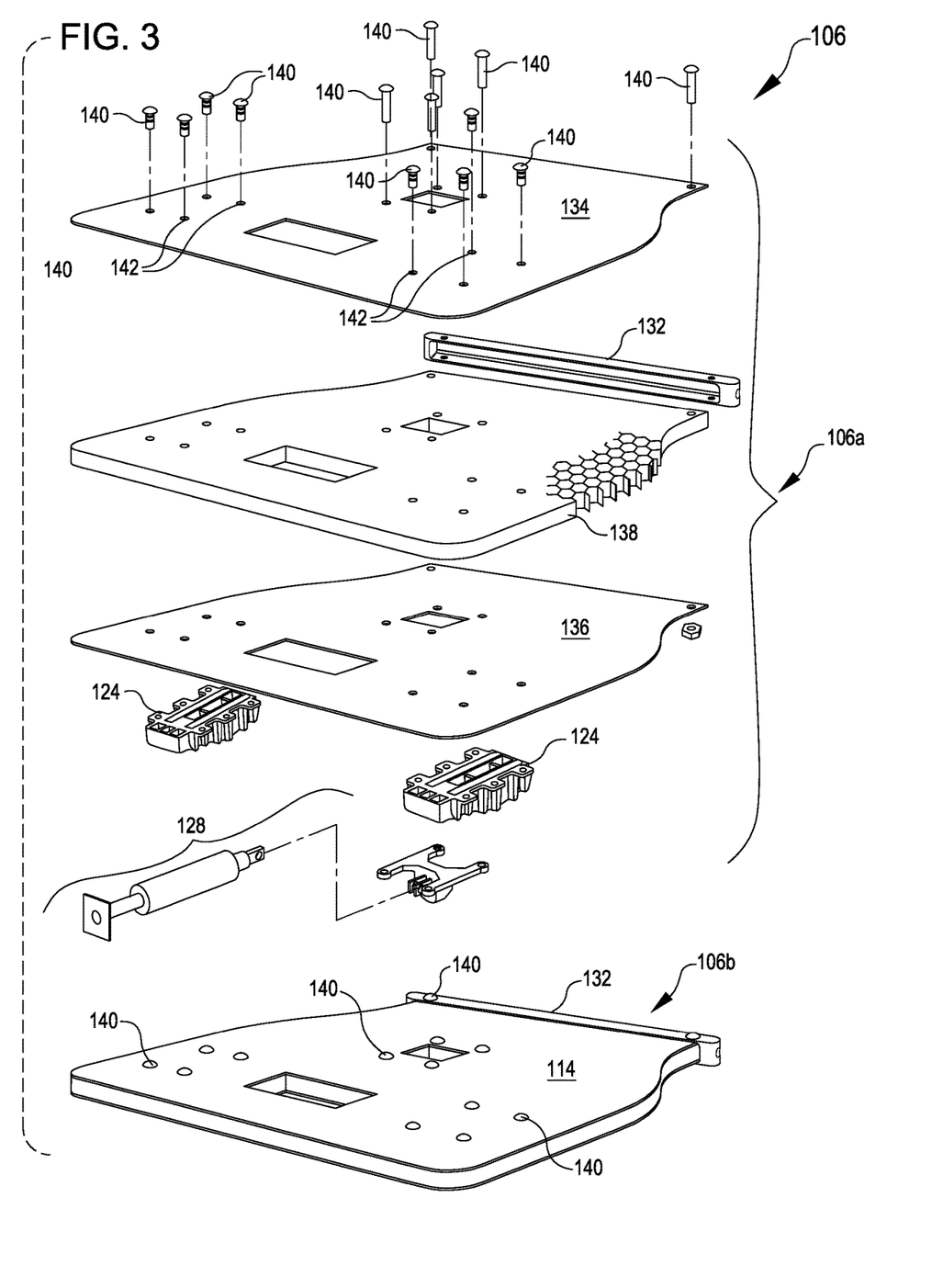
FIG. 3 is an assembly view showing detailed aspects of the layered seat bottom assembly shown in FIGS. 1 and 2.

FIG. 3 is an exploded assembly view showing detailed aspects of the seat bottom assembly 106, and particularly the seat pan 114 shown in FIGS. 1 and 2. The seat bottom assembly 106 is shown exploded 106a and assembled 106b, and includes a seat pan 114, sliding linkage 124, recline lock assembly 128, and a rear bracket 132 that is positioned and configured to connect the seat pan 114 with the seat back 116 by the articulating linkage 122. As assembled, the seat pan 114 is connected with the sliding linkage 124 and recline lock assembly 128 by a plurality of connectors 140 attached to the seat pan via through-holes 142 in the layered assembly of the seat pan.

The seat pan 114 is formed of a sandwiched arrangement of two face sheets, a top face sheet 134, a bottom face sheet 136, and a core layer 138. Conventional seat pans are typically formed of either a thick metal sheet or a thick composite sheet, which is formed into a contoured shape to create directional strength. Unlike a conventional sheet pan, the embodiments of seat pans 114 described herein are formed by layering a discrete set of face sheets about a core layer. Thus, even though the count of individual parts may be higher, the assembled seat pan 114 does not require a complex shaping step and simplifies the addition of other parts, ultimately reducing the cost and complexity of installation without sacrificing effectiveness. Surprisingly, by bonding the face sheets 134, 136 together with the core layer 138, the bonded seat pan 114 acquires strength in tension, torsion, and shear that can equal or exceed that of a shaped metal or composite seat pan of comparable weight.

The top face sheet 134 and bottom face sheet 136 may be permanently bonded to the core material, e.g. by a pressure and/or temperature sensitive adhesive, which may permeate the core layer, lay at the interface of the core layer and the face sheets, or include an adhesive film or adhesive layer set between the core layer and each face sheet. The adhesive may be foamed, sprayed, painted to the respective parts of the face sheets and core sheet, or may be placed as a layer prior to heat and/or pressure treatment to establish bonding.

In some embodiments, as where the seat bottom assembly 106 is slidingly connected with the seat frame 104 such that the seat bottom assembly can articulate with respect to the seat frame, the seat back assembly 108 can also be mechanically and pivotally linked with the seat bottom assembly so that the seat bottom assembly and seat back assembly can articulate together in response to force induced by a passenger. The seat bottom assembly 106 may be connected with the seat frame 104 by a recline lock assembly configured to prevent or permit articulation of the layered seat bottom assembly with respect to the frame in response to actuation of the recline lock, by pivotally connecting the recline lock assembly with both the seat bottom assembly and the seat frame. The seat bottom assembly can be covered by a seat cushion 118 connected with an upper surface, e.g. the top face sheet 134, of the seat bottom assembly. According to various embodiments, the top face sheet 134, core layer 138, and bottom face sheet 136 are planar, resulting in a planar or substantially planar seat pan 114 that is lightweight, simple to manufacture and assemble, while possessing excellent strength against tension, bending, and shear due to the interaction of the metal face sheets and core layer.

Figure 4:
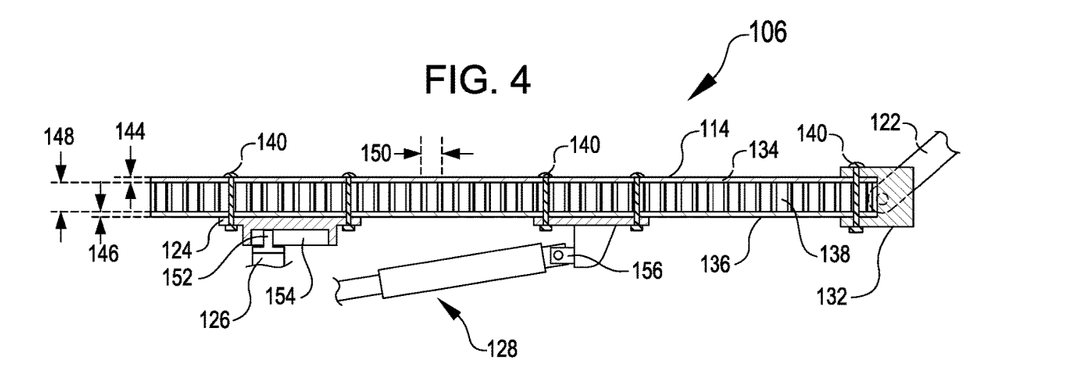
FIG. 4 is side section view showing a first example of a layered seat bottom assembly as shown in FIGS. 1-3.

Connecting the layered seat bottom assembly with the seat frame can include bonding or mechanically connecting the layered seat bottom assembly with the one or more sliding connectors, (e.g. by adhesive material or by mechanical connectors such as bolts, screws, or the like) and attaching the one or more sliding connectors to the seat frame. For example, FIG. 4 is side section view showing a first example of the layered seat pan 114 of the seat bottom assembly 106 as shown in FIGS. 1-3, connected with the sliding linkages 124 and recline lock assembly 128. The seat pan 114 is connected with the articulating linkage 122 at a rearmost portion of the seat pan by the rear bracket 132. The sliding linkage 124 can be directly attached to the seat pan 114 by way of the connectors 140 passed through throughholes 142 in the seat pan 114. The recline lock assembly 128 can also be connected to the seat pan 114 by way of a recline lock bracket 156 that allows the recline lock assembly 128 to pivot and extend or contract as needed to accommodate articulation of the seat bottom assembly 106. The sliding linkages 124 can engage with sliding supports 126 attached with the seat frame 104 (FIGS. 1-2), such that a slider 152 in one of the connector or support engages with a guide 154 to allow forward and aft motion of the seat pan 114.

The top face sheet 134 and bottom face sheet 136 have respective thicknesses 144, 146 that are small relative to the core layer thickness 148, such that much of the volume occupied by the seat pan is made up of the core layer, resulting in a relatively small weight of the total assembly.

The face sheets 134, 136 can be formed of a metal, polymer, or composite in various thicknesses depending on the weight, strength, and selected material, e.g. less than 0.25 cm (0.1 in), preferably less than 0.025 cm (0.01 in), preferably less than 0.0125 cm (0.005 in), or more preferably less than 0.0025 cm (0.001 in). Exemplary materials for the face sheets may include metal sheets, e.g. aluminum, magnesium, alloys thereof or comparable materials; fiber reinforced polymer composite sheets, etc. In some specific embodiments, the face sheets may be aluminum and have a thickness in the range of 0.0025 to 0.25 cm (0.001 to 0.10 in), preferably from 0.02 to 0.08 cm (0.008 to 0.032 in). Alternatively, the face sheets may be steel and have a thickness in the range of 0.0025 to 0.25 cm (0.001 to 0.10 in), preferably from 0.01 to 0.04 cm (0.008 to 0.032 in). The face sheets may also be a polymer or polymer/fiber composite and have a thickness in the range of 0.0025 to 0.25 cm (0.001 to 0.10 in), preferably from 0.01 to 0.04 cm (0.008 to 0.032 in); or the face sheets may be formed of magnesium or a magnesium alloy, and have a thickness in the range of 0.0125 to 0.5 cm (0.005 to 0.20 in), preferably from 0.02 to 0.25 cm (0.008 to 0.1 in).

The core layer 138 can be formed of a variety of materials as well including, e.g., a honeycombed metal structure, preferably a honeycombed aluminum structure; or a lightweight polymer foam, composite foam, metal honeycomb, or aramid honeycomb. According to various embodiments, and depending on the material selected, the core material could have a thickness of less than 7.6 cm (3.0 in), preferably less than 2.5 cm (1 in), preferably less than 0.25 cm (0.1 in), or more preferably less than 0.05 cm (0.2 in). The thickness of the core may vary depending on the selected material. For example, according to some embodiments, the core layer 138 can be an aluminum honeycomb core having a thickness from about 0.125 to 7.72 cm (0.05 to 3.0 in), preferably from 0.25 to 2.5 cm (0.1 to 1 in). Alternatively, the core layer 138 may be a foam core (e.g. a polymer foam or composite foam), or an aramid honeycomb having a thickness from about 0.125 to 7.72 cm (0.05 to 3.0 in), preferably from 0.25 to 2.5 cm (0.1 to 1 in); or the core layer 138 may be a polycarbonate layer having a thickness from about 0.005 to 0.25 cm (0.002 to 0.1 in), preferably from 0.01 to 0.25 cm (0.004 to 0.1 in). For embodiments that include a honeycombed core layer 138, the internal dimensions (e.g. minimum widths) of the honeycomb structure can be small, on the order of about 1.52 mm to about 9.5 mm (about 0.06 to 0.37 in).

Figure 5:
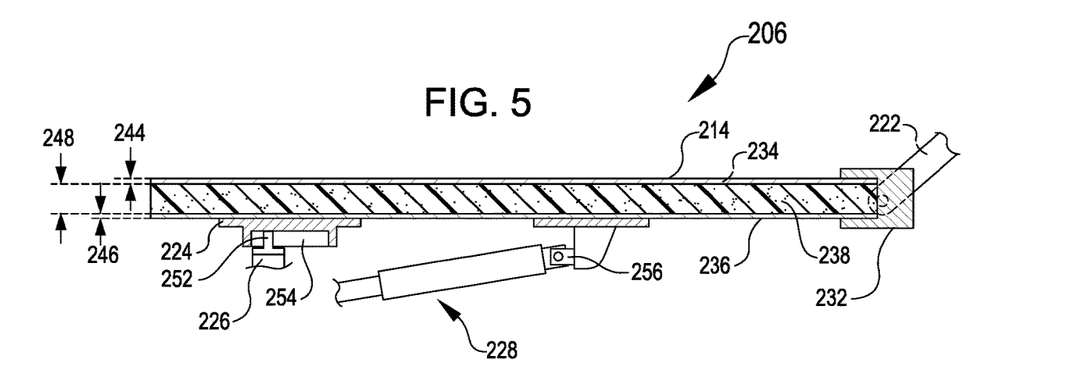
FIG. 5 is side section view showing a second example of a layered seat bottom assembly as shown in FIGS. 1-3.

FIG. 5 is side section view showing a second example of a layered seat bottom assembly 206 compatible with a passenger seat assembly 102 as shown in FIGS. 1-3, in which components are generally bonded with one another rather than attached via through-mounted connectors 140. For example, as shown, the seat bottom assembly 206 includes a seat pan 214 connected with sliding linkages 224 and a recline lock assembly 228 similar to those described above using like reference numbers. The seat pan 214 is connected with the articulating linkage 222 at a rearmost portion of the seat pan by the rear bracket 232.

In contrast to embodiments shown above, the sliding linkage 224 can be adhered or bonded to the seat pan 214 by way of, e.g., heat or pressure-sensitive adhesive, glue, spot welding, or other forms of direct bonding. The recline lock assembly 228 can also be bonded to the seat pan 214 by way of a recline lock bracket 256. The sliding linkages 224 can engage with sliding supports 226 attached with the seat frame 204 (FIGS. 1-2), such that a slider 252 in one of the connector or support engages with a guide 254 to allow forward and aft motion of the seat pan 214. As above, the top face sheet 234 and bottom face sheet 236 have respective thicknesses 244, 246 that are small relative to the core layer thickness 248, such that much of the volume occupied by the seat pan is made up of the core layer, resulting in a relatively small weight of the total assembly. Note that FIG. 4 illustrates a grid-type core layer such as a honeycomb, whereas FIG. 5 illustrates a foam core layer 238; however, the various types of core layer materials and face sheet materials can be combined in any suitable combination.

Structural elements of the seats (e.g. passenger seat assemblies 102, seat frame 104, seat bottom assembly 106 (FIG. 1), as well as seat pan 114 including the bottom face sheet 136, top face sheet 134, and core layer 138 or analogous parts, or other structural components (FIGS. 1-5)) as well as any intervening structural elements or attachment elements therein, may be formed of materials including but not limited to aluminum, magnesium, titanium, stainless steel, aramid fibers, polycarbonate, polypropylene, other metallic materials, composite materials, or other similar materials.

In the following, further examples are described to facilitate the understanding of the invention:

Example A. A seat bottom assembly for a passenger seat, the assembly comprising: a first face sheet, a core material bonded with the first face sheet; and a second face sheet bonded with the core material opposite the first face sheet, wherein the seat bottom assembly is configured to connect with a seat frame.

Example B. The assembly of example A, wherein the first face sheet, the core material, and the second face sheet are planar.

Example C. The assembly of example A or example B, further comprising: a plurality of sliding connectors attached to a bottom side of the seat bottom assembly and configured to slidingly connect the seat bottom assembly with a seat assembly frame.

Example D. The assembly of any of the preceding examples, wherein the first face sheet and the second face sheet comprise planar sheets of a metal, polymer, or composite.

Example E. The assembly of any of the preceding examples, wherein the first face sheet and the second face sheet comprise aluminum sheets or fiber reinforced polymer composite sheets.

Example F. The assembly of any of the preceding examples, wherein the core material comprises a honeycombed metal structure, preferably a honeycombed aluminum structure.

Example G. The assembly of any of the preceding examples, wherein the core material comprises a lightweight polymer foam, composite foam, metal honeycomb, or aramid honeycomb.

Example H. The assembly of any of the preceding examples, wherein the first face sheet and the second face sheet have thicknesses of less than 0.25 cm (0.1 in), preferably less than 0.025 cm (0.01 in), preferably less than 0.0125 cm (0.005 in), preferably less than 0.0025 cm (0.001 in).

Example I. The assembly of any of the preceding examples, wherein the
core material has a thickness of less than 7.6 cm (3.0 in), preferably less than 2.5 cm (1 in), preferably less than 0.25 cm (0.1 in), or preferably less than 0.05 cm (0.2 in).

Example J. The assembly of any of the preceding examples, wherein the first face sheet and the second face sheet are permanently bonded to the core material.

Example K. The assembly of any of the preceding examples, wherein the first face sheet and the second face sheet are bonded with the core material by a pressure and/or temperature sensitive adhesive.

Example L. A passenger seat, comprising: a seat frame configured to attach to a passenger compartment floor; and a layered seat bottom assembly connected with the seat frame, the layered seat bottom assembly comprising: a first face sheet, a core material bonded with the first face sheet; and a second face sheet bonded with the core material opposite the first face sheet.

Example M. The passenger seat of example L, further comprising a seat back assembly pivotally connected with the seat frame, wherein: the seat bottom assembly is slidingly connected with the seat frame such that the seat bottom assembly can articulate with respect to the seat frame in response to force induced by a passenger; and the seat bottom assembly is pivotally connected with the seat back assembly.

Example N. The passenger seat of any of the preceding examples, wherein: the first face sheet and the second face sheet comprise planar metal sheets; and the core material comprises a metal honeycomb.

Example O. The passenger seat of any of the preceding examples, wherein the seat bottom assembly is operably connected with the seat frame by a recline lock assembly configured to prevent or permit articulation of the layered seat bottom assembly with respect to the frame in response to actuation of the recline lock.

Example P. The passenger seat of any of the preceding examples, further comprising a substantially flat seat cushion connected with an upper surface of the first face sheet.

Example Q. The passenger seat of any of the preceding examples, wherein the first face sheet, the core material, and the second face sheet are planar.

Example R. A method of installing a seat bottom assembly in a passenger seat, the method comprising: slidingly connecting a layered seat bottom assembly with a seat frame of a passenger seat assembly by one or more sliding connectors, the layered seat bottom assembly comprising: a first face sheet, a core material bonded with the first face sheet; and a second face sheet bonded with the core material opposite the first face sheet; connecting the layered seat bottom assembly with a reclinable seat back of the passenger seat assembly by a pivoting connector; and assembling a seat cushion with the layered seat bottom assembly to form a passenger seat bottom.

Example S. The method of example R, further comprising: connecting a recline lock to the layered seat bottom assembly oriented such that the recline lock can resist or permit motion of the layered seat bottom assembly in response to actuation of the recline lock.

Example T. The method of any of the preceding examples, wherein slidingly connecting the layered seat bottom assembly with the seat frame comprises bonding the layered seat bottom assembly with the one or more sliding connectors and attaching the one or more sliding connectors to the seat frame.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat bottom assembly for a passenger seat, the seat bottom assembly comprising:
    a first face sheet;
    a core material bonded with the first face sheet; and
    a second face sheet bonded with the core material opposite the first face sheet;
    wherein the first face sheet and the second face sheet each have a thickness of less than 0.25 cm (0.1 in); and
    wherein the second face sheet is bonded with a plurality of sliding connectors that attach to a seat frame to slidingly connect the seat bottom assembly with the seat frame; wherein the plurality of sliding connectors comprise a plurality of sliding linkages bonded with the second face sheet and a plurality of sliding supports attached to a seat tube of the seat frame; and wherein the plurality of sliding linkages each comprise a guide that engages with a corresponding slider of the plurality of sliding supports.

2. The seat bottom assembly of claim 1, wherein the first face sheet, the core material, and the second face sheet are planar.

3. The seat bottom assembly of claim 1, wherein the first face sheet and the second face sheet are bonded with the core material by a pressure and/or temperature sensitive adhesive.

4. The seat bottom assembly of claim 1, wherein the first face sheet and the second face sheet comprise planar sheets of a metal, polymer, or composite.

5. The seat bottom assembly of claim 1, wherein the first face sheet and the second face sheet comprise aluminum sheets or fiber reinforced polymer composite sheets.

6. The seat bottom assembly of claim 1, wherein the core material comprises a honeycombed metal structure.

7. The seat bottom assembly of claim 1, wherein the core material comprises a lightweight polymer foam, composite foam, metal honeycomb, or aramid honeycomb.

8. The seat bottom assembly of claim 1, wherein the thickness of each of the first face sheet and the second face sheet is less than 0.025 cm (0.01 in).

9. The seat bottom assembly of claim 1, wherein the core material has a thickness of less than 7.6 cm (3.0 in).

10. The seat bottom assembly of claim 1, wherein the first face sheet and the second face sheet are permanently bonded to the core material.

11. A method of installing a seat bottom assembly in a passenger seat, the method comprising:
    slidingly connecting a layered seat bottom assembly with a seat frame of a passenger seat assembly by coupling the layered seat bottom assembly with one or more sliding connectors and attaching the one or more sliding connectors to the seat frame, the layered seat bottom assembly comprising:
    a first face sheet,
    a core material bonded with the first face sheet; and
    a second face sheet bonded with the core material opposite the first face sheet;
    wherein the first face sheet and the second face sheet each have a thickness of less than 0.25 cm (0.1 in); and
    wherein the one or more sliding connectors comprise a plurality of sliding linkages coupled to the second face sheet and a plurality of sliding supports attached to a seat tube of the seat frame; wherein the plurality of sliding linkages each comprise a guide that engages with a corresponding slider of the plurality of sliding supports; and
    connecting the layered seat bottom assembly with a reclinable seat back of the passenger seat assembly by a pivoting connector; and
    assembling a seat cushion with the layered seat bottom assembly to form a passenger seat bottom.

12. The method of claim 11, wherein coupling the plurality of sliding linkages to the second face sheet comprises attaching the layered seat bottom assembly to the plurality of sliding linkages by one or more attachment elements that pass through the first face sheet, the core material, and the second face sheet.

13. The method of claim 11, further comprising:
    operably connecting a recline lock to the second face sheet via a recline lock bracket, the recline lock being oriented to resist or permit motion of the layered seat bottom assembly in response to actuation of the recline lock.

14. A passenger seat, comprising:
- a seat frame configured to attach to a passenger compartment floor; and
- a seat bottom assembly connected with the seat frame, the seat bottom assembly comprising:
  - a first face sheet,
  - a core material bonded with the first face sheet; and
  - a second face sheet bonded with the core material opposite the first face sheet; and
  - wherein the first face sheet and the second face sheet each have a thickness of less than 0.25 cm (0.1 in); and
- wherein the seat bottom assembly is slidingly connected with the seat frame by attaching the seat bottom assembly to one or more sliding connectors by one or more attachment elements that pass through the first face sheet, the core material, and the second face sheet; wherein the one or more sliding connectors comprise a plurality of sliding linkages coupled to the second face sheet via the one or more attachment elements and a plurality of sliding supports attached to a seat tube of the seat frame; and wherein the plurality of sliding linkages each comprise a guide that engages with a corresponding slider of the plurality of sliding supports.

15. The passenger seat of claim 14, further comprising a substantially flat seat cushion connected with an upper surface of the first face sheet.

16. The passenger seat of claim 14, wherein the first face sheet, the core material, and the second face sheet are planar.

17. The passenger seat of claim 14, further comprising a seat back assembly pivotally connected with the seat frame, wherein:
- the seat bottom assembly is slidingly connected with the seat frame such that the seat bottom assembly can articulate with respect to the seat frame in response to force induced by a passenger; and
- the seat bottom assembly is pivotally connected with the seat back assembly.

18. The passenger seat of claim 14, wherein:
- the first face sheet and the second face sheet comprise planar metal sheets; and the core material comprises a metal honeycomb.

19. The passenger seat of claim 14, wherein the seat bottom assembly is operably connected with the seat frame by a recline lock assembly, the recline lock assembly comprising a recline lock bracket coupled to the second face sheet, the recline lock assembly configured to prevent or permit articulation of the seat bottom assembly with respect to the seat frame in response to actuation of the recline lock assembly by a user.

* * * * *